US007613920B2

(12) United States Patent
Gustave et al.

(10) Patent No.: US 7,613,920 B2
(45) Date of Patent: Nov. 3, 2009

(54) MECHANISM TO AVOID EXPENSIVE DOUBLE-ENCRYPTION IN MOBILE NETWORKS

(75) Inventors: Christophe Gustave, Aylmer (CA); Vinod Kumar Choyi, Ottawa (CA); Mladen Gavrilovic, Ottawa (CA)

(73) Assignee: Alcatel Lucent, Paris (FR)

( * ) Notice: Subject to any disclaimer, the term of this patent is extended or adjusted under 35 U.S.C. 154(b) by 768 days.

(21) Appl. No.: 11/207,801

(22) Filed: Aug. 22, 2005

(65) Prior Publication Data
US 2007/0043940 A1 Feb. 22, 2007

(51) Int. Cl.
*H04L 29/06* (2006.01)
(52) U.S. Cl. .................................... 713/155; 380/248
(58) Field of Classification Search ........................ None
See application file for complete search history.

(56) References Cited
U.S. PATENT DOCUMENTS
2002/0178365 A1 11/2002 Yamaguchi

FOREIGN PATENT DOCUMENTS
WO WO 03/029916 A2 4/2003
WO WO 2005/117382 A 12/2005

OTHER PUBLICATIONS

IEEE Standard Part 11: Wireless LAN Medium Access Control and Physical Layer Specifications, IEEE Computer Society, Jul. 23, 2004.
(Carneiro, G. et al.) "Cross-Layer Design in 4G Wireless Terminals", IEEE Wireless Communications, IEEE Service Center, Piscataway, NJ, vol. 11, No. 2, Apr. 2004, pp. 7-13.

*Primary Examiner*—Gilberto Barron, Jr.
*Assistant Examiner*—Shahrouz Yousefi
(74) *Attorney, Agent, or Firm*—Kramer & Amado, P.C.

(57) ABSTRACT

A method for enabling a mobile node to transmit encrypted data over a path including a wireless link and an untrusted link, while avoiding double encryption on any link. The data on the end-to-end path is encrypted using an application specific security mechanism, or an L2 mechanism is used for encrypting the data on the wireless link as mandated by the wireless standards, and an application specific security mechanism is used for encrypting the data on the untrusted link. By avoiding redundant double encryption, the method of the invention results in optimizing the use of network resources in bandwidth-limited wireless networks and increases the life of the mobile node battery.

25 Claims, 7 Drawing Sheets

FIGURE 1a

Remote terminal

Base Station (BS)

Mobile Node (MN)

S1 (Authentication)

S2 (BS notifies MN of link identifiers)

S5 (record/check Source/dest. address)

FIGURE 1b

S3 (HL encr & append ID Y)

S4 (HL encr. frames)

S6 (Integrity check)

FIGURE 1c

S10 (append ID X & AES encrypt frames)

S11 (L2 encr. frames)

S12 (L2 decr./L2 encr.)

S13 (clear frames)

FIGURE 8

MECHANISM TO AVOID EXPENSIVE DOUBLE-ENCRYPTION IN MOBILE NETWORKS

FIELD OF THE INVENTION

The invention is directed to communication networks and in particular to a mechanism to avoid expensive double-encryption in mobile networks.

BACKGROUND OF THE INVENTION

Communications within networks must be kept secure at all times and in all places to avoid disclosing of confidential information to unauthorized entities. The difficulties of keeping a network secure are increased dramatically in wireless communications networks, where use of the air interface makes the task of unauthorized listeners easier, since information exchanged over the air can be easily eavesdropped when encryption is not applied. The importance of securing wireless networks grows with the proliferation of wireless devices (cell phones, laptops, personal digital assistants or PDAs, two-way pagers, etc.) and services (e-mail, text, messaging, video, voice) offered by the wireless network and equipment providers.

Various cryptographic algorithms may be used in order to maintain data in a secure state over network communication channels. Generally, encryption/decryption operations are resource-intensive, requiring a very fast processor, or a long time to complete. Other methods have relied on a large amount of memory. Therefore, when developing security for mobile networks, two major constraints inherent to mobile devices (or mobile nodes, or mobiles) must be considered: the availability of lower power consumption and the computing resources (e.g. processing power, memory, bandwidth) of a typical mobile device. These constraints are increasingly relevant due to the modern trend to develop smaller and lighter mobile nodes, since batteries and computational hardware must be integrated into a reduced volume. Therefore, in order to enable mobile users with the same services as the users of wired networks, and to preserve at the same time the service quality, it is imperative to se the hardware resources of mobile nodes as efficiently as possible. In this case, the impact of this requirement on the mobile devices is directly relevant to the security of the mobile networks.

For the reader's convenience, some acronyms used in this specification are listed below.

AES—Advanced Encryption Standard

The current approved algorithm for use by the US government for securing critical data. It specifies an algorithm (Rijndael) and appropriate key lengths for various uses.

DES—Data Encryption Standard

An algorithm used by the US government for securing critical data. This is a symmetric-key encryption system.

S-HTTP (or HTTPS)—Secure HyperText Transfer Protocol

A protocol for transmitting data securely over the Internet approved by the Internet Engineering Task Force (IETF) as a standard. By convention, URL's that require a secure connection start with https: instead of http:

IPSec—Internet Protocol Security

Standard set of network protocols defined by the Internet Engineering Task Force (IETF) to enable secure exchange of datagrams at the IP layer.

SSL—Secure Sockets Layer

A protocol developed by Netscape for transmitting private documents (e.g. credit card numbers) via the Internet, using a private key to encrypt data.

TLS—Transport Layer Security

A protocol that ensures privacy between communicating applications and their users on the Internet. When a server and client communicate, TLS ensures that no third party may eavesdrop or tamper with any message. TLS is the successor to the Secure Socket Layer (SSL).

GSM—Group Special Mobile

English translation is Global System for Mobile communications. GSM is the world's most widely used digital mobile telephony system.

UMTS network—Universal Mobile Telecommunication System network

It is one of the major Third Generation mobile communications technologies that are being developed within the framework of ITU.

WPA—Wi-Fi Protected Access

A Wi-Fi standard designed to improve the security features of the Wired Equivalence Protocol (WEP), the security mechanism specified by the 802.11 standard. WPA includes two improvements over WEP, namely data encryption using the Temporal Key Integrity Protocol (TKIP), and user authentication using the Extensible Authentication Protocol (EAP).

WiMax—Worldwide Interoperability for microwave access

WiMax is a wireless industry coalition whose members are organized to promote IEEE 802.16 standards for Broadband Wireless Access (BWA) networks. WiMax 802.16 technology is expected to enable multimedia applications with wireless connection and enable networks to have a wireless last mile solution In current mobile network deployments, mobile nodes are sometimes required to perform multiple encryptions and decryptions. This is usually the case when application-specific security is used in conjunction with security mechanisms at the local access network. Firstly, IEEE 802.11i specifications require that communications over the radio link be encrypted using AES, or TKIP to protect the traffic over the air-interface. Secondly, application-specific security like HTTPS, which uses SSL for encryption, and integrity-protection are used to protect the communication between users and application servers; when a mobile user associates with an 802.11 network and connects to an application server, HTTPS is used to provide end-to-end protection over the Internet. This provides a very robust mechanism for protecting user traffic against eavesdropping and data modification.

The problem with this approach is that the traffic from the mobile node is first protected using SSL and then 802.11i protection using AES is applied to the SSL-encrypted traffic. The access point on receiving the traffic decrypts the related data using AES and then forwards the SSL-protected datagrams to the appropriate network element for further forwarding to the final destination (the application server). Therefore, the user traffic is double-encrypted between the device and the access point.

A similar double encryption approach is also used between nodes on a multi-hop wireless network. A concrete example of this is a laptop connecting to a VPN (virtual private network) gateway on the Internet through an IPSec tunnel, while using AES encryption for the local wireless network. In this case, encrypted IPSec traffic is encrypted again through WPA before being sent to the access point. This second encryption is redundant, as it does not contribute to security and degrades both performance and battery life of the laptop. For mobile nodes such as PDAs and cellular phones that are even more compact than laptops, judicious use of the battery power is crucial.

To summarize, the current security solutions for mobile networks include some form of double encryption/decryption, whether it is between the mobile and the access point or between the nodes of the wireless network. This causes CPU resource consumption since encryption is a very computationally intensive operation. Such computations also drain the battery faster, and as discussed above, the power supply of the mobile devices is at a premium when considering the limitation in current battery technology and sizes that are thought to be acceptable. Therefore, it would be highly beneficial if this duplication could be avoided.

Furthermore, ensuring that encryption and integrity protection mechanisms are not duplicated across the different layer of the OSI model is of stringent interest for devices that need to access services in an efficient and reliable way. This is especially the case for real-time applications that require fast packet processing and subsequent handling. Adding redundant protection mechanisms at different network layers can dramatically decrease the overall end-to-end performance rates associated to such applications. The difficult part is to find a way to make the layers to interact intelligently, embedding sufficient information into the network data flow, so that they can synchronize their security protection features at the network link level.

There is a need for a mechanism permitting two parties communicating over a wireless network to negotiate the best way to secure the networking communication channel, without duplicating protection features associated to a specific network layer.

There is also a need to provide a security mechanism that is generic, flexible, and can be used in conjunction with a wide variety of wireless networks. As more and more wireless networks are deployed, the need to reduce the complexity in multiple encryption/decryption process will be considered actively and this also means eventual changes to standards and the inter-working of different radio standards to perform only single encryption operations.

SUMMARY OF THE INVENTION

It is an object of the invention to provide an improved system and method for performance enhancement of encrypted data traffic in a wireless networking environment.

It is another object of the invention to provide a method and system for avoiding redundant (multiple) encryptions of the same datagrams in mobile networks.

Accordingly, the invention provides a method of avoiding double encryption at a mobile node (MN) that requests a connection with a remote terminal on an untrusted network, comprising the steps of: a) establishing a datapath over a first link between the MN and a base station (BS) and a second link between said BS and said remote terminal, said datapath for serving said connection; b) marking the datagrams that contain confidential information with a first identifier and the datagrams that do not contain confidential information with a second identifier; c) encrypting the datagrams at said NM according to said first and second identifier; and d) at said BS, decrypting only the datagrams marked with said identifier.

The invention is also directed to a base station (BS) for enabling a mobile node to access a remote terminal over a datapath having a first link between the MN and the BS and a second link between the BS and the remote terminal, comprising: means for storing first identifiers and second identifiers and allocating to the MN a pool of first identifiers and a pool of second identifiers; an L2 decryption mechanism for L2 decrypting datagrams with a second identifier from the pool of second identifiers received from the MN and transmitting the L2 decrypted datagrams to the remote terminal, without any additional encryption; a secure link table (SLT) for recording the source/ destination address of datagrams received from the MN and having a first identifier from the pool of first identifiers; means for identifying in the SLT the source/destination address of any datagram received from the remote terminal; an L2 encryption mechanism for L2 encrypting any datagram received from the remote terminal that does not has the source/destination address in the SLT.

According to another aspect of the invention, a mobile node (MN) for communicating with a remote terminal over a datapath with a first link between the MN and a base station (BS) and a second link between the BS and the remote terminal is provided. The mobile node comprises processing means for requesting a first and a second identifiers from the BS and marking the datagrams that contain confidential information with the first identifier and the datagrams that do not contain confidential information with a second identifier; an application specific mechanism for HL encrypting the datagrams with the first identifier and transmitting same to the remote terminal over the datapath; and an L2 encryption mechanism for L2 encrypting the datagrams with the second identifier and transmitting same to the BS over the first link for L2 decryption.

A still further aspect of the invention relates to a method of avoiding double encryption at a mobile node (MN) that requests a connection with a remote terminal connected to an untrusted network, comprising the steps of: a) establishing a datapath over a first link between the MN and an intelligent base station (iBS) and second link between the iBS and the remote terminal, the datapath for serving the connection; b) for uplink communication, L2 encrypting datagrams at the MN using a L2 encryption mechanism and transmitting the L2 encrypted datagrams to the iBS, whereby the traffic is L2 encrypted along the first link; and c) at the iBS, L2 decrypting the datagrams, HL encrypting the datagrams using an application-specific security mechanism and transmitting the HL encrypted traffic to the remote terminal, whereby the traffic is HL encrypted along the second link, wherein the BS is not trusted by the MN.

In still another embodiment, the invention provides an intelligent base station (iBS) for enabling a mobile node to access a remote terminal over a datapath having a first link between the MN and the BS and a second link between the BS and the remote terminal, comprising: means for creating and managing secure channels on behalf of the MN; means for L2 decrypting datagrams arriving form the MN and L2 encrypting datagrams arriving from the remote terminal; and means for HL encrypting L2 decrypted datagrams and for HL encrypting L2 decrypted datagrams.

Advantageously, the method of the invention avoids redundant double encryption, which results in optimizing the use of network resources in bandwidth-limited wireless networks. Also, this invention allows more efficient use of computational and hardware resources of mobile clients such as cell phones, PDAs, laptops, etc. Since according to the invention the mobiles do not have to perform additional processing, a base station can serve a larger number of mobiles, thus improving the CAPEX spending. For example, in a multi-hop or mesh network implementation, the invention can be used to optimize network performance without costly hardware upgrades.

From a user's perspective, computing and bandwidth are the primary concern and therefore any savings on those resources are a big advantage.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 1a-1c illustrate the "per-frame signaling" method according to an embodiment of the invention, where

FIGS. 4a to 4c illustrate the "per-frame signaling" method of the invention applied to the scenario of FIG. 3, where

DETAILED DESCRIPTION

The method of the invention is directed to avoiding redundant double encryption, with a view to optimize the use of network resources in bandwidth-limited wireless networks. The terms below are used in this specification for describing the invention.

Any network with untrusted/unauthenticated nodes, such as the Internet is called an "untrusted network" or "UN". Sensitive traffic passing through an untrusted network must be encrypted and authenticated. This encryption is performed generally at L3 (for corporate networks, etc) or L4 (for bank networks, etc) of the TCP/IP model. An "Access Network" or "AN" is the local network that the mobile node and base station belong to L2 encryption of datagrams is required and specified by IEEE 802.11i.

The term "mobile node" or "MN" designates a device used to communicate over a wireless network, such as a laptop, PDA (personal digital assistant), cellular phone, etc. The term "base station" or "BS" designates here the mobile node's gateway (access point AP) to any remote, untrusted network. The BS can be a WLAN access point, a cellular base transceiver station (BTS), etc. The term "Intelligent Base Station" or "iBS" refers to a BS which contains extended functionality that allows it to negotiate application-specific secure sessions on behalf of a client MN. For example, a BS that can negotiate an IPSec connection on behalf of a MN is an iBS.

The term "remote terminal" is used to generically designate data terminal at the other end of the communication link, which exchanges traffic with the mobile node. The remote terminal could be "Application-Specific Security Gateway" or "ASG". ASG is a generic term used for a gateway that uses a security protocol at a higher layer than the data-link layer. VPN gateways or SSL gateways are examples of ASGs. A remote terminal could also be a data terminal which requires or not encryption of the traffic over the untrusted public network. It is to be noted that term "remote" is a relative term used for convenience, and it should not be construed in any limiting way.

The terms uplink and downlink refer to the direction of transmission, and are relative terms. In this specification, "uplink" refers to the mobile node-remote terminal direction, while "downlink" refers to the remote terminal-mobile node direction.

The term "authentication" refers to the process of determining whether a network entity is, in fact, what it is declared to be. In private and public computer networks (including the Internet), authentication is commonly done through the use of logon passwords. Each user registers initially using an assigned or self-declared password. On each subsequent use, the user must know and use the previously declared password. The weakness in this system for transactions that are significant (such as the exchange of money) is that passwords can often be stolen, accidentally revealed, or forgotten.

The term "integrity check" refers to the process of ensuring that the data (information) under consideration has not been modified in transit. Integrity is an essential role of cryptography systems.

The term "trusted/secure" base station refers to a base station that meets the capacity, performance, scalability, availability and network management requirements to deliver reliable ("trusted") services towards the end-customer.

As indicated above, communication over the wireless link between the mobile node and the access point to an untrusted land network must perform an L2 encryption and respectively decryption, as required by the IEEE 802.11i, hereinafter called "L2 encryption". The mobile node must also perform L3 or L4 encryption, and respectively decryption using an application specific mechanism (IPSec, SSL, etc.) available at the respective layer, hereinafter called "higher level (HL) encryption". HL encryption/decryption is used whenever the mobile node communicates with an application-specific security gateway (ASG) over an untrusted network. In order to avoid double encryption, the base station (BS) in a wireless network needs to be aware of which traffic from the mobile node (MN) has already been HL encrypted. Similarly, when the MN receives traffic from the BS, it needs to know whether to perform HL decryption or not. Two possible ways to achieve this are provided in this specification, called "per-frame signaling" method and respectively "iBS secure session management" method. The BS and MN functionality needed for these two approaches are described next.

Per-Frame Signaling

Per frame signaling method is suitable for a large number of deployments, where there is no trust relationship between the BS and the MN. In this approach, the mobile node negotiates each link independently and signals the base station on a frame-by-frame basis about which frames should be decrypted in addition to being integrity-checked. While the specific method for providing this kind of signaling is implementation-dependent, a generalized way of implementing this method it is to make the BS respond to multiple destination addresses. The BS allocates an additional identifier to each frame, the identifier indicating if the respective frame has been encrypted or not using a higher-layer mechanism. For example, ID X—may be used for non-HL encrypted frames and ID Y for HL encrypted frames. Each identifier may include a pool of frame identifiers; by way of example, ID X may include a pool of frame identifiers between 1 and 100, and ID Y may include a pool of frame identifiers between 101 and 200. The BS responds to the respective identifiers and processes the traffic according to the destination it was sent to.

If after the MN has been authenticated, the BS detects that a frame carries an ID X identifier, meaning that the frame has been L2 encrypted at the mobile node, it just L2 decrypts the frame, and forwards it towards the destination. If the BS sees a frame carrying an identifier ID Y, meaning that the MN has not performed L2 encryption, the BS does not have to perform L2 decryption.

Figure 1A:
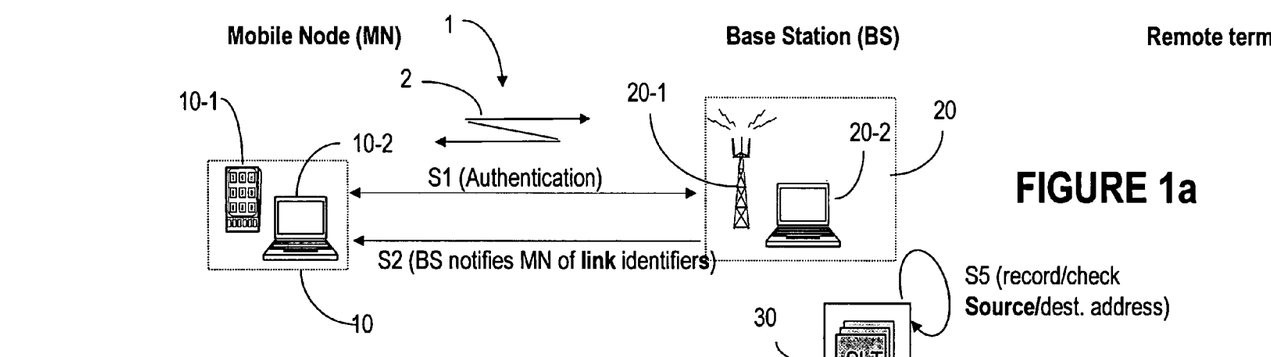
FIG. 1a shows allocation of identifiers to the mobile node.
Figures 1B, 1C:
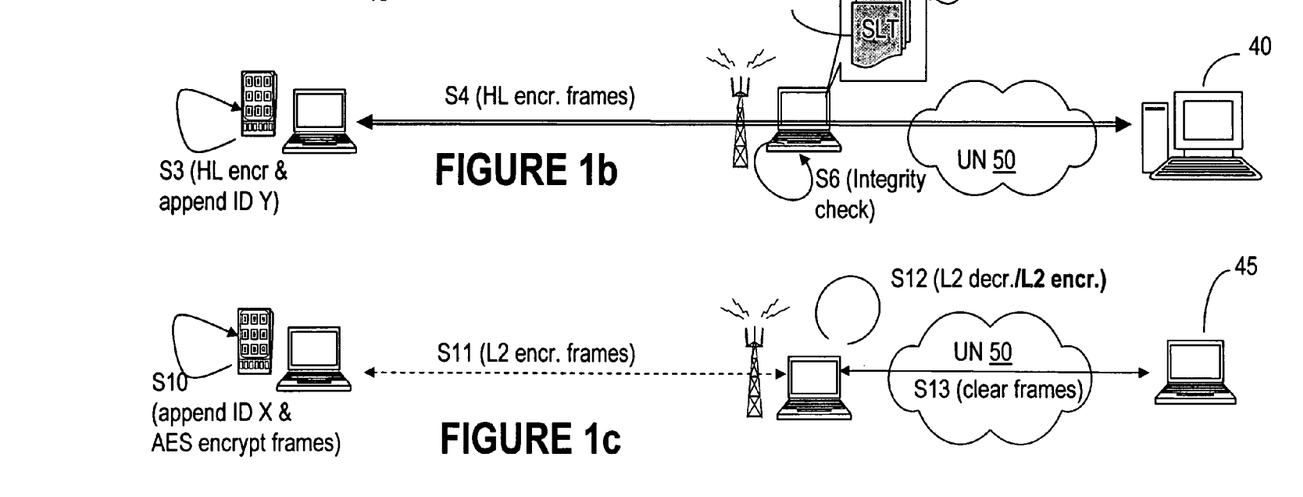
FIG. 1b shows the flow of the application specific (or HL) encrypted traffic.
FIG. 1c illustrates the flow of the non HL encrypted traffic.

FIGS. 1a to 1c show a typical session using per-frame signaling. Here, a mobile node (PDA, cellular, laptop, etc) 10 communicates with a base station (BS) 20 over a wireless link 2 established over a mobile access network 1 (wireless, cellular). BS 20 enables the users of the mobile network 1 to access to a remote terminal 40 or 45 connected over an untrusted network 50, such as Internet. The BS is illustrated generically by an antenna 20-1 and a data terminal 20-2, and the mobile node 10 is illustrated generically as a portable data terminal device 10-1 and a data terminal (e.g. a laptop) 10-2.

The remote terminal may be an application specific security gateway (ASG) 40 (see FIG. 1b). In this case, some communications over the untrusted network 50 must be kept secure at all times to avoid sharing of confidential information (e.g. credit card numbers, confidential information exchanged over a corporate intranet, etc). As such, the traffic over network 50 must be HL encrypted. The remote terminal may also be a personal computer 45 (see FIG. 1c). In this case, the communication over untrusted network 50 does not need to be always kept confidential (e.g. web downloads). As such, traffic over network 50 may not need encryption; remote terminal 45 is shown as a laptop by way of example, with the intention to illustrate a terminal that does not require encryption of the data obtained over untrusted network 50. For example, the remote terminal 45 may be a wireless device, connected to the network 50 over a respective wireless network (not shown). It is also to be understood that representation of devices 10, 20, 40, and 45 are provided by way of example and are not intended to limit the scope of the invention.

FIG. 1a shows allocation of identifiers to the mobile node. When MN 10 requests access to the network, BS 20 first authenticates the identity of the MN, as shown in step S1. Next, the MN requests from the BS an identifier to reflect the security level of the transmission, i.e. to advise the BS if the respective frames are HL encrypted or not. In response, the BS indicates to the respective MN which identifiers from pool ID X and ID Y are free, as shown by step S2. Now, the MN may select for the respective connection an ID X, or ID Y identifier, depending on the desired level of security for the transmission. Let's assume, as before, that the ID X pool is used for the non-HL encrypted traffic and ID Y pool is used for the HL encrypted traffic.

FIG. 1b shows the flow of the HL encrypted traffic. If the MN intends to establish a secure communication link with remote terminal 40, after the initial steps S1 and S2 shown in FIG. 1a, it HL encrypts the frame, and appends to it a respective identifier from pool ID Y, as shown in step S3. The identifier from pool ID Y may be appended to the address information of the frame. Then the MN begins transmission of the HL encrypted frames to the BS, step S4. However, in this case the MN does not perform L2 encryption for transmission of frames over the wireless link, as in the prior art systems, since the frame is already HL-encrypted. In this way, the system shown in FIG. 1 avoids double encryption.

When BS 20 receives a frame with an identifier from the ID Y pool, the BS records the destination IP address and port of the packet and the source IP address and port for the node, step S5. This address information is kept in a Secure Link Table (SLT) 30. No L2 decryption is needed in this case, so the BS only performs an integrity check, step S6.

For the downlink direction, data terminal (the remote terminal) 40 HL encrypts the frames and transmits them over the untrusted network 50 to base station 20. Next, the BS 20 examines the source/destination IP addresses and source/destination ports. If the source/destination pair matches an entry in the SLT 30, it means that the data is HL encrypted. In this case, the data is only sent to the MN with an integrity-check code, and no L2 encryption for the wireless link is performed/needed.

FIG. 1c illustrates the flow of the non-HL encrypted traffic, for the case when the MN intends to establish a non-secure communication link with data terminal 45. In this case, the MN appends an ID X identifier to each frame from the ID X pool of identifiers indicated as available for the respective application. The ID X identifier may be appended to the address information of the frame. Once the frame is L2 encrypted for transmission over the wireless link 2, as shown in step S10 the identifier is appended to the frame. The L2 encrypted frame is then transmitted to the BS 20, as shown in step S11. The BS receives the frame, checks the identifier and recognizes that the frame is L2 encrypted, so that it decrypts it, as shown in step S12. Then the non-encrypted frame is transmitted to remote terminal over network 50, as shown in step S13. The frames are not encrypted, as the information is not intended to be kept secret over the un-trusted network.

For the downlink direction, the "clear" frames are transmitted by remote terminal 45 to BS 20. The base station recognizes that the frame is not L2 encrypted by looking in the Secure Link Table (SLT) 30. If there does not exist an entry for the source/destination pair in the SLT, the BS 20 appends to the frames an ID X identifier then, and the data is L2 encrypted using a security mechanism employed by the access network 1. The L2 encrypted frames are transmitted over the wireless link 2 to mobile node 10. The mobile recognizes the ID X identifier and decrypts the frames using the appropriate L2 mechanism.

Table 1 shows an example of an SLT table 30 for TCP/IP networks.

TABLE 1

Secure Link Table

| Link Identifier | MN IP Address | MN Port | ASG IP Address | ASG Port |
|---|---|---|---|---|
| ID X1 | 192.168.0.43 | 3245 | 135.168.33.21 | 10001 |
| ID X2 | 192.168.0.43 | 4335 | 209.120.145.6 | 27005 |
| ID Y1 | 192.168.0.28 | 6249 | 166.135.88.58 | 21 |
| ... | ... | ... | ... | ... |

To enable per frame signaling, the mobile node is equipped with processing means for requesting the first and the second identifiers from the BS and marking the datagrams according to their level of confidentiality. Thus, the processor will allocate identifier ID Y to the frames (datagrams) that have to be encrypted at the higher layers while ID X is used to identify frames that are not to be encrypted by higher layer mechanisms. The frames with the ID Y identifier are HL encrypted using an application specific mechanism (IPSec, SSL, etc.), and the datagrams with the ID X identifier are encrypted using a respective L2 mechanism.

An important advantage of this approach is that the BS does not need to be very complex or expensive to implement, since it does not need to be application-aware. It simply processes each packet depending on the identifier that the MN attaches to the frame and L2 encrypts or decrypts the data if needed.

Thus, the base station should include a memory for storing the pools of ID X and ID Y identifiers that are available for use by the mobile node. The base station also needs to have an L2 decryption mechanism for L2 decrypting the frames with the ID X identifier received from the MN and transmitting these frames to the remote terminal without any further encryption. The BS maintains the secure link table (SLT) with the respective IP source/destination address/port of the frames associated with the ID Y identifier and some means for identifying in the SLT the source/destination address of any frame received from the remote terminal. If the address information of a frame is not in the SLT, the respective frame is passed to an L2 encryption mechanism for L2 encryption before being sent to the MN.

The per-frame method complements the iBS approach (which is discussed next), and can be used in the following scenarios:
1. the BS is not trusted by the MN;
2. the BS does not have enough hardware resources to efficiently manage sessions on behalf of a high number of MNs;
3. the BS is not very secure, in which case compromising the BS does not compromise the MN-to-ASG link;
4. there is a high number of required application-specific security mechanisms, in which case the BS does not need to be aware of every application that an MN might use to provide security.

iBS Secure Session Management

With this method, single encryption is achieved by using an application-aware intelligent base station (iBS). The iBS must be trusted by the MN for this approach to be effective. In addition to standard BS functionality, the iBS has three "intelligent" capabilities. Namely, the BS has means for creating and managing secure channels on behalf of MN; means for encrypting data for an ASG on the other side of a UN through application-specific mechanisms; and means for decrypting data from an ASG and forwarding same to the destination MN through local security mechanisms.

Figure 2:
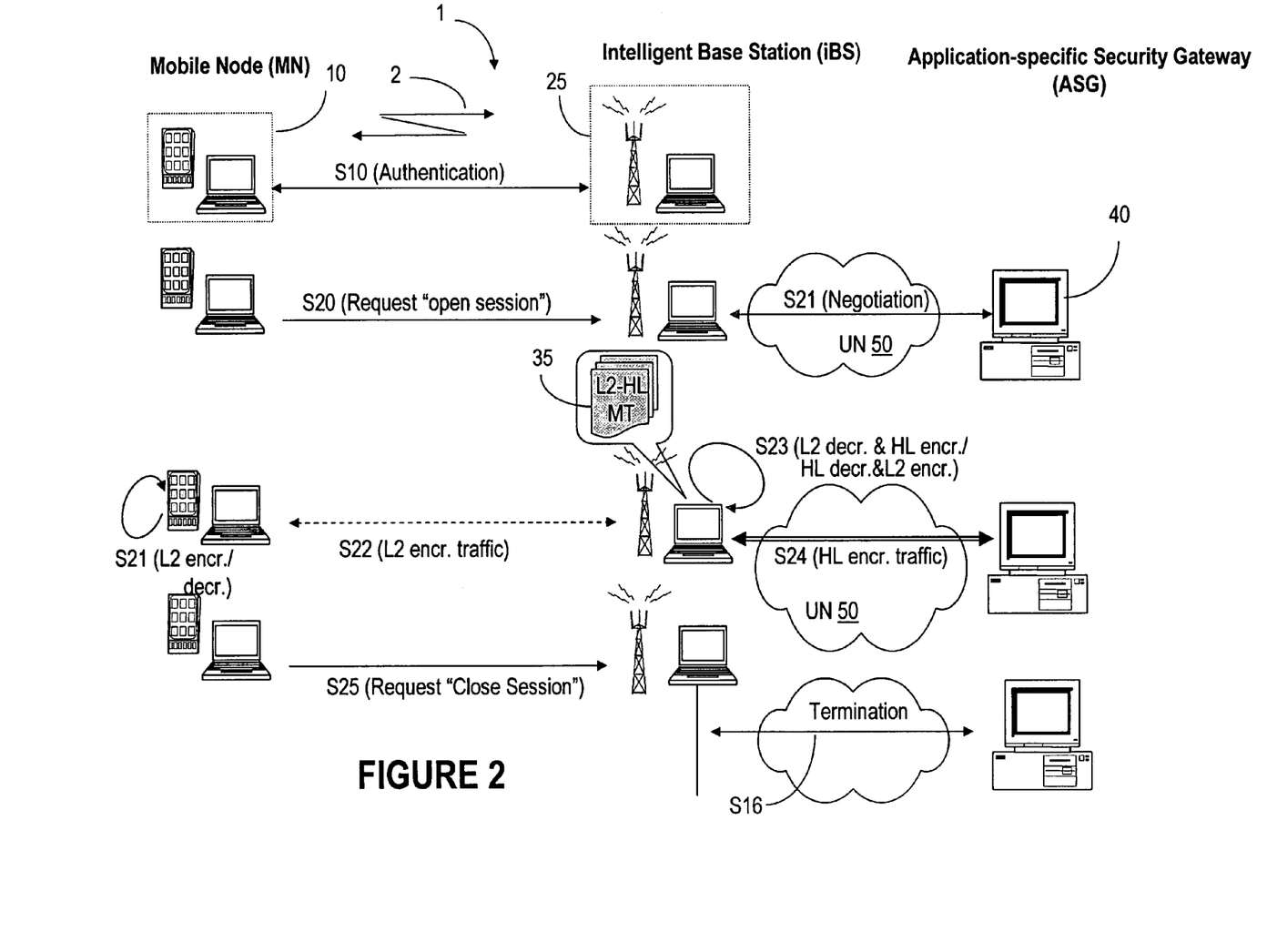
FIG. 2 illustrates the "iBS secure session management" method according to another embodiment of the invention.

FIG. 2 shows a configuration which may use the iBS secure session management approach. In this scenario, a MN 10 intends to communicate with an application-specific security gateway (ASG) 40 on the other side of a UN 50 using an application-specific security mechanism. An intelligent base station iBS 25 is used as the access point between the mobile network 1 and the untrusted network 50. As in the scenario shown in FIG. 1a, first the MN 10 is authenticated by the iBS 25 with the respective wireless network mechanisms, step S10. Next, MN 10 sends an "open session" request to the iBS 25, step S20 asking for a connection to a service hosted by the ASG 40. The iBS creates a secure session with ASG 40 using the credentials sent by the MN, as shown in step S21. The ASG would behave in the same manner as if it was directly connected to the MN.

After this, the MN 10 encrypts the traffic using local mechanisms (e.g. AES/DES encryption or other encryption defined by Radio standards like 802.11i, 802.16 or other wireless protocols), step S21 and transmit L2 encrypted traffic over wireless link 2, as shown in step S22. The iBS then L2 decrypts the traffic and re-encrypts it using any HL mechanism, as shown in step S23. To this end, the iBS maintains a mapping table 35; an example of such a table is shown below:

TABLE 2

L2__HL mapping table

| MN | Destination: Security Gateway@ | Type/Level of Security Algorithms | Keys |
|---|---|---|---|
| MN1: 128.133.21.14 | 145.160.12.12 | AES, HMAC | Acd1289e23 |
| MN2: 124.112.10.12 | 139.140.12.16 | 3DES, HMAC | 93adec93 |

Table 2 shows the parameters that are populated when a secure connection needs to be set, for mobile node—Security Gateway direction. Namely, Table 2 includes in this example the addresses of a mobile node (e.g. 128.133.21.14) mapped to the address of a respective ASG (145.160.12.12), and the algorithms used for encryption and message authentication (AES and HMAC) respectively. The corresponding keys are also stored. Another table for traffic flow from the Security Gateway to the MN can be maintained if the algorithms and the keys that are used are different from those used by the traffic flow from the MN to the Security gateway.

The HL encrypted traffic is then sent to ASG 40, as shown in step S24. When the MN no longer desires communication with the ASG 40, it sends a "Close Session" message to the iBS, shown by step S25. The iBS then closes the session to the ASG, step S26.

In the downlink direction, iBS 25 performs decryption of the traffic originating from the ASG 40 intended to the MN 10 via a respective application-specific mechanism. It also performs L2 encryption for transmission of frames on wireless link 2; in this way the traffic is secured via the security mechanism at the access network 1. The MN L2 decrypts the traffic, and does not need to perform any HL decryption. Since the iBS performs the energy and processing power consumption HL encryption and decryption the NM sees no difference in the way it exchange traffic.

The main advantage of this method is a better performance, both in processing cycles and in battery life, at the MN. Other than the initial message instructing the iBS to open a session to the ASG, and the final message instructing the iBS to close the session, the mobile node incurs no performance penalty for sending traffic to the ASG. All of the connection management is done at the iBS, which is fixed and presumably has much higher performance and data processing capabilities than the MN. This approach is appropriate for deployments where the iBS is trusted by the MN; the iBS has enough hardware resources to efficiently manage sessions on behalf of a high number of MNs; the iBS is very secure, because compromising the iBS would mean compromising the MN/ASG link; and the number of required application-specific security mechanisms is reasonably low, since otherwise the iBS implementation would become very complex. An example of where iBS could be used is a VPN connection to a corporate network wherein the iBS provides IPSec connection to the ASG. In this case the ASG works like a Security gateway at the edge of an enterprise/corporation network.

Note that it may not always be necessary for the node to explicitly tell the iBS to open a session—in a scenario where the ASG, iBS, and MN all trust each other, the iBS can seamlessly intercept the MN's secure session setup messages and open a link to the ASG in place of the MN.

Examples for the solutions proposed in this specification are provided next with a view to illustrate implementations of the invention; they are not intended to limit the applications of this invention. The first example refers to a WLAN (wireless LAN), in which an MN is trying to communicate with an ASG on the other side of a UN through a BS or an iBS. The parameters of this example are as outlined in Table 2.

TABLE 2

Application Specific Example: WLAN

| | |
|---|---|
| Mobile Node 10 | Personal Digital Assistant (PDA) 10-1 with a WLAN (Wi-Fi) interface and a VPN client 10-2 Example: palmOne, Tungsten C with Certicom, movianVPN |
| Base Station 21 Intelligent Base Station | 802.11b Wireless Access Point with extensions described above |
| Application-specific Security Gateway 65 | Alcatel 7130 Secure VPN gateway |
| Untrusted Network | Internet 55 |

Figure 3:
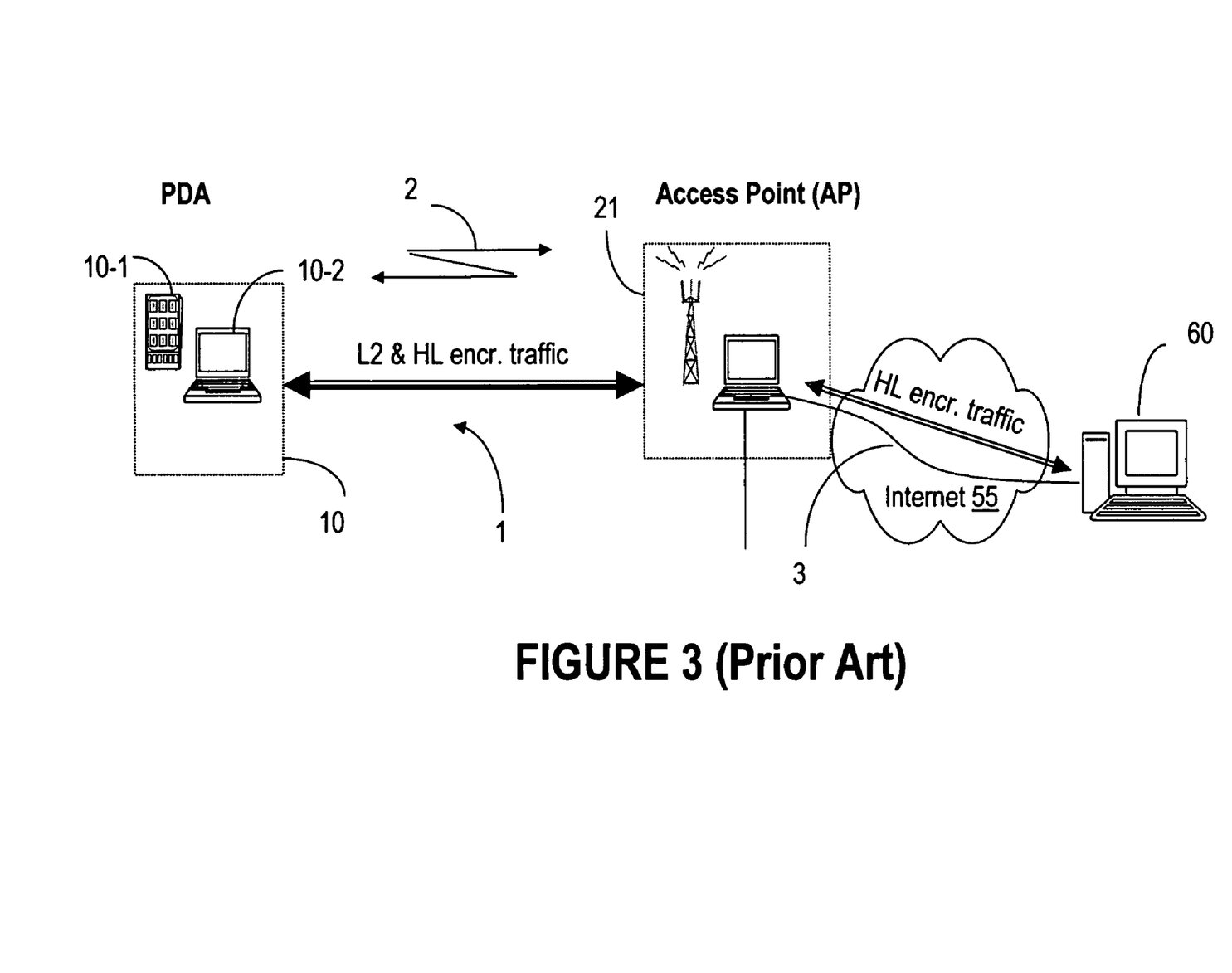
FIG. 3 shows an example of the traditional communication between a mobile terminal on a WLAN accessing a VPN.

FIG. 3 shows the traditional mobile VPN access scenario. In this example, a roaming user 10 tries to access the corporate network from a WLAN 1 hotspot using his/hers PDA 10-1 and a mobile VPN client 10-2.

In current mobile VPN access scenarios, the PDA is required to perform encryption and authentication at two layers. In fact, the datapath between the MN 10 and the VPN gateway 60 includes two links, a wireless link 2 and link 3 over the Internet 55 (UN). The traffic on both links must be encrypted. A secure link 3 is needed since VPN gateways protect sensitive information on a corporate network. A secure link 2 is needed in order to protect both the privacy of the PDA communications and the integrity of the WLAN's usage logs. For example, when the user is browsing the web or downloading data, s/he does not want that her/his personal information and/or download activities become available to the surrounding nodes, for privacy and security reasons. As a matter of fact, this information can be easily eavesdropped on the radio interface when encryption is not applied.

Also, authentication must be performed at both AP 21 and VPN gateway 60. The access point 21 must be assured of the identity of each mobile node it serves for billing purposes, non-repudiation, etc. Therefore, authentication is also required at the WLAN. Authentication at the VPN Gateway 60 is also needed since the VPN usage is limited to authorized users. So, the current implementations need authentication at the VPN gateway 60, as well as encryption and authentication at the WLAN 1.

These requirements make communication with a VPN gateway quite costly for the PDA. In order to send a message to the corporate network, PDA 10 needs first to HL encrypt it for the VPN gateway (application specific encryption), and then L2 encrypt this ciphertext once more for the access point (L2 encryption). Similarly, when it receives a message from the corporate network, PDA 10 needs to decrypt it twice. Since both encryption mechanisms are independently secure, this double encryption/decryption is redundant and it unnecessarily shortens the battery life and consumes hardware resources of the PDA. This inefficiency can be solved using any of the ways described above.

Description and illustration of a possible solution using per-frame signaling according to the invention follows. As in the example of FIG. 3, FIG. 4 illustrates the traffic flow between a mobile client 10, a BS (access point) 20 as in FIGS. 1a-1c and a VPN gateway 60. In this approach, the access point uses its regular MAC address, as well as an application-specific MAC address. For example, let's assume that the regular MAC address is MAC Z, and the application-specific MAC address is MAC 0, (address 00:00:00:00:00:00). It is to be noted that the MAC 0 does not have to be used to designate HL encrypted traffic. This designation can be any MAC, as long as the configuration is advertised by the access point to the network. In the unlikely event that a node with a colliding MAC address enters the network, the access point can change its HL encryption MAC and broadcast the new MAC to the authenticated nodes.

Figure 4A:
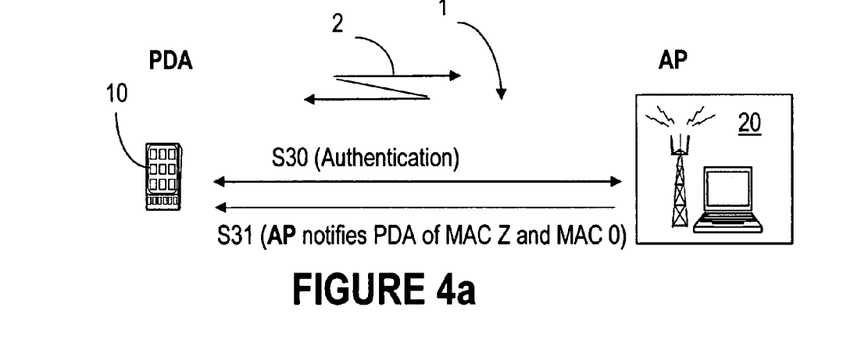
FIG. 4a shows the allocation of MAC addresses to the mobile user.

FIG. 4a shows the allocation of MAC addresses to the mobile user. When the PDA sends a frame to AP 20, an authentication step S30 is set-up and the AP 20 notifies the PDA of the MAC addresses (MAC Z and MAC 0) available for indicating if the messages are L2 encrypted or not, as shown in step S31.

Figure 4B:
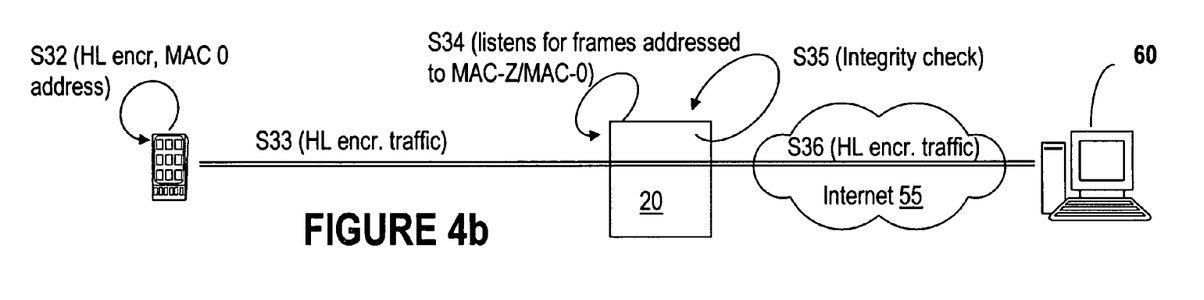
FIG. 4b shows the flow of HL encrypted traffic and FIG. 4c shows the flow of the non-HL encrypted traffic.
Figure 4C:
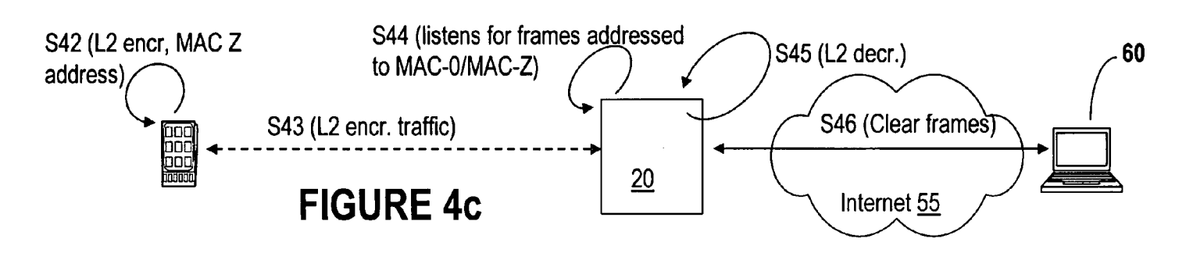

FIG. 4b shows the flow of HL encrypted traffic, using the per-frame signaling method of the invention. In this case, the PDA 10 only performs HL encryption, as shown in step S32. By sending a frame to MAC 0 address, step S33, the PDA informs the AP that the data encapsulated by the MAC header is already encrypted using an application-specific mechanism (HL encrypted). The AP listens for frames addressed to MAC Z or MAC 0, as shown in step S34. Once it recognizes that a frame has a MAC 0 address, the AP 20 only integrity checks the frame as shown in step S35, and forwards it to the VPN gateway 60, step S36. Since in this scenario the access point 20 only integrity-checks the traffic and forwards it, the access point needs to be neither trusted nor application-aware, making it appropriate for deployments in highly ubiquitous environments as public hot-spots, etc FIG. 4c shows flow of the non-HL encrypted traffic. In this case, the PDA uses MAC Z address. The PDA L2 encrypts the traffic for ensuring its security across the wireless link 2, step S42, and transmits the frames to MAC Z address, step S43. The AP listens for frames addressed to MAC Z or MAC 0 , as shown in step S44. Once it recognizes that a frame has a MAC Z, AP 20 L2 decrypts the frame, as shown by step S45 and forwards the clear traffic to the VPN gateway over the Internet 55, step S46.

Figure 5:
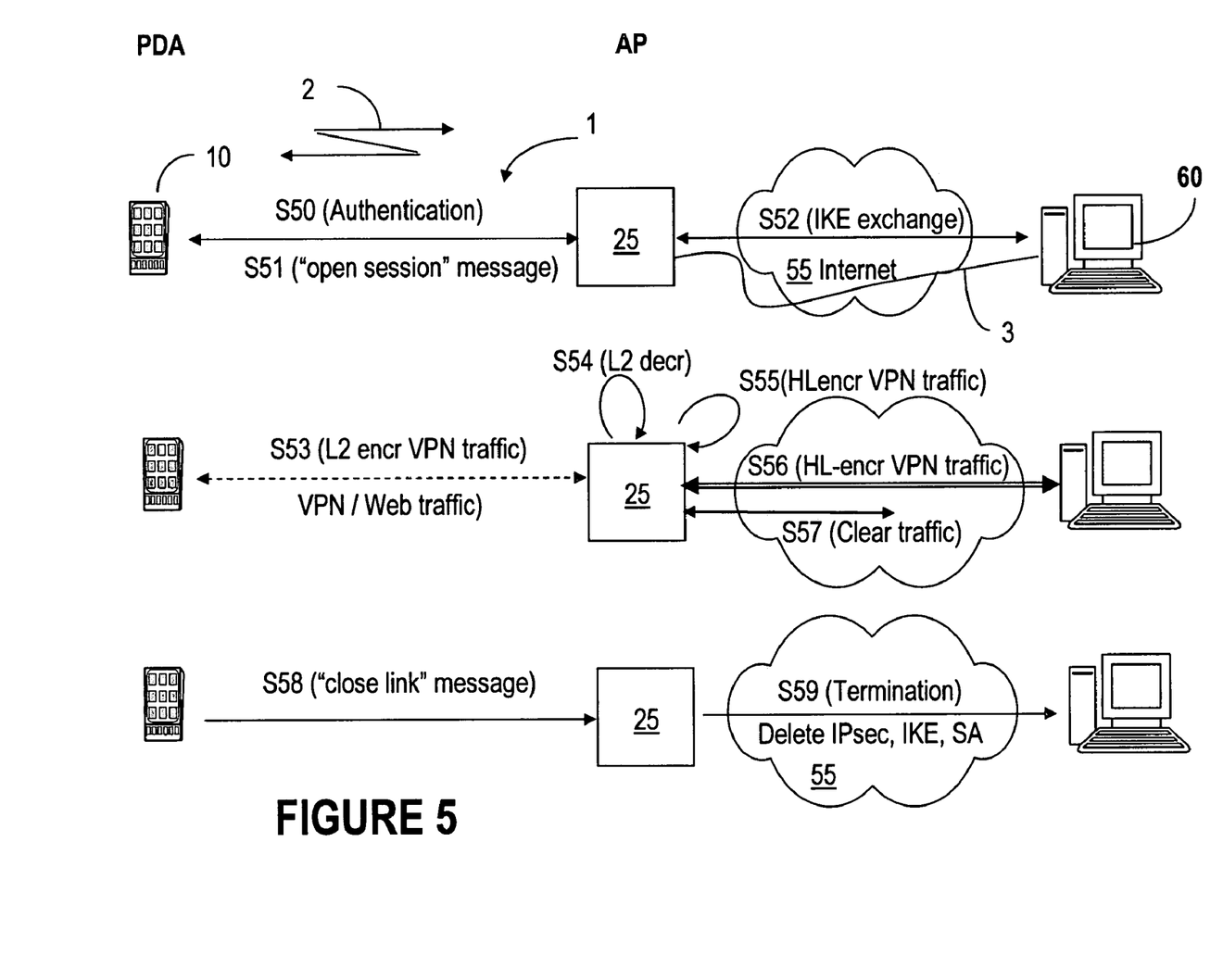
FIG. 5 illustrates the "iBS secure session management" method of the invention applied to the scenario of FIG. 3.

Description and illustration of a possible solution using the iBS secure session management solution for the above WLAN—specific example of FIG. 3 is described and illustrated next in connection with FIG. 5. The first step performed by the PDA 10 and AP 25 is authentication, denoted with S50. Next, the PDA sends an authenticated "open session" message to the iBS, step S51. Let's assume that the authentication method chosen is pre-shared key (PSK). The PDA also sends with this message its IKE (Internet Key Exchange) credentials. IKE is an IPSec (Internet Protocol Security) standard protocol specified in IETF RFC 2409, which is used to ensure security for virtual private network (VPN) negotiation and remote host or network access. IKE defines an automatic means of negotiation and authentication for IPSec security associations.

After receiving the message and the PSK, the iBS undergoes an IKE negotiation with the VPN gateway, step S52, and creates an IPSec tunnel 3 to the corporate network. From this point forward, any traffic that the PDA sends out is still only encrypted for the WLAN (L2), step S53. When the iBS sees traffic going to the VPN gateway 60, it L2 decrypts it, step S54 and HL encrypts it according to the negotiated IPSec SA, shown by step S55, before forwarding it to the VPN, shown in step S56. If the traffic is not destined for the VPN, e.g. the user is just surfing the web, the traffic is only L2 decrypted in step S54 and sent out in the clear, step S57.

To end the session, the PDA sends a "close link" message to the AP 25 as illustrated in step S58, at which point the AP deletes the IPSec tunnel to the corporate network and the IKE and SA, as shown in step S59.

For the reverse direction, when the iBS 25 receives traffic from the VPN gateway 60, it decrypts it according to IPSec SA that was negotiated in step S52 and then L2 encrypts it for the PDA according to the mechanism negotiated for the WLAN. In this way, the PDA could avoid multiple redundant encryptions.

Figure 6:
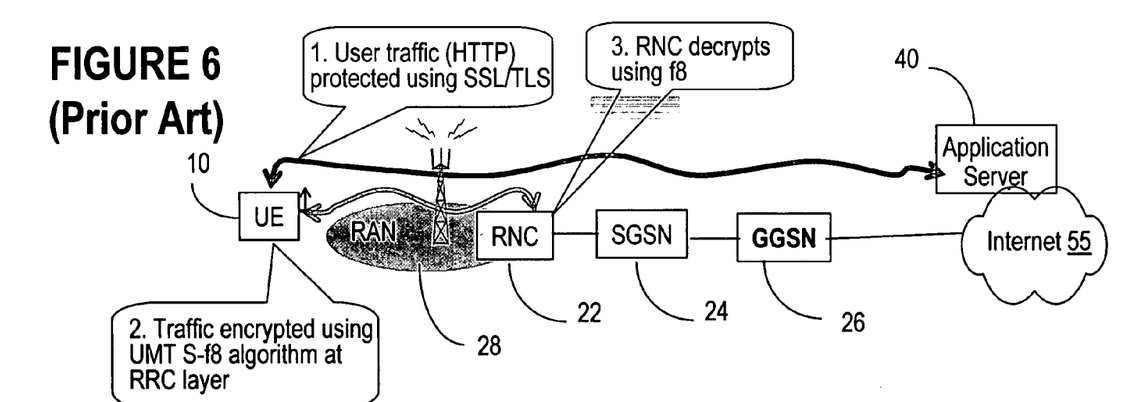
FIG. 6 shows another scenario with double encryption performed by the user equipment in traditional mobile networks.

A further example of the application of the present invention is described and illustrated next for a Universal Mobile Telecommunication System (UMTS) network. FIG. 6 shows a connection established between the user equipment 10 and an application server 40 in a UTMS network using the conventional methods. UTMS networks use serving GPRS (General Packet Radio Service) Support Nodes (SGSN) denoted here with 24 and gateway GPRS support nodes (GGSN), denoted here with 26. A SGSN 24 is a mobile core node that is responsible for the delivery of data packets from and to the mobile stations within its geographical service area. Its tasks include packet routing and transfer, mobility management (attach/detach and location management), logical link management, authentication, interception and charging functions. A GGSN 26 has the function to interconnect the GPRS network with the external world, such as the Internet. The GGSN can help mobile packet network operators to evolve to become suppliers of high added value services.

In the radio access network (RAN) 28, the encryption for uplink traffic (MN to BS) is performed by the user equipment (UE) 10, while the decryption is performed at the Radio Network Controller (RNC) 22 or any other network entity in the RAN. For the downlink traffic, the RNC L2 encrypts the traffic and the UE decrypts it. This is in accordance with UMTS Authentication and Key Agreement (UMTS-AKA) Specifications of 3GPP (Third Generation Partnership Project).

Currently, as shown in FIG. 6, when UE 10 connects to an application server 40 the UE is required to encrypt the traffic to protect it when traversing the Internet, since the UMTS-AKA does not protect the traffic beyond the Radio Access Network (RAN) 28. Since AS 40 uses HTTPS (SSL/TLS) UE must use protocols like SSL/TLS and the algorithms negotiated by SSL/TLS to encrypt the user traffic. These are for example computationally-intensive encryption engines like DES, AES. In addition, double-encryption is performed by the UE to protect the traffic over the air (within UTMS) by using the f8 algorithm which is based on Kasumi (a block cipher that produces 64-bit output to 64-bit input and using 128 bits key), which is defined by 3GPP. Therefore, in the general case, the user data from the MN is first encrypted using AES/DES or other methods for SSL/TLS and then at the UMTS Radio layer, the traffic is again encrypted using f8 and then the traffic is sent to the RAN using UMTS protocols. Again, the traffic undergoes multiple encryption in the example shown in FIG. 6.

Figure 7:
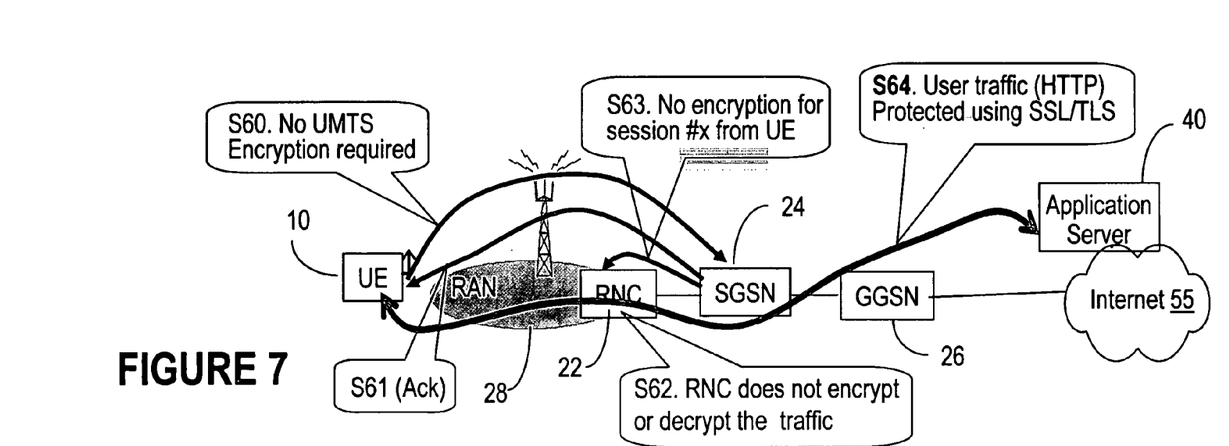
FIG. 7 illustrates a mechanism that conveys to the SGSN that encryption of user traffic is not required.

FIG. 7 illustrates a mechanism where it is conveyed to the SGSN that encryption of user traffic at the radio-layer is not required, implying that the user traffic sent by the MN to the BS will not be encrypted using f8 and therefore the BS should not attempt to de-crypt the traffic but instead just check for integrity and forward the traffic as is. By employing the selective encryption methods as shown above, the UE informs the SGSN during PDP (Packet Data Protocol) Context Activation phase that encryption of user traffic over the air is not required, as shown at steps S60 and S61. This information is then conveyed to the RNC 22, which then does not employ L2 decryption for uplink, shown in step S62 and L2 encryption for downlink, shown in step S63. The traffic between the user 10 and the application server 40 is then protected using only SSL/TLS, as shown in step S64.

A further example of the application of the present invention is described next and illustrated in connection with FIG. 8 for a multi-hop/mesh network. Unlike a conventional wireless network, a multi-hop wireless network is one where datagrams/packets from wireless devices hop from one wireless device/base-station to another until the destination is reached. The destination in this case need not be another wireless device; it can also be a fixed device. The traffic that traverses each of these wireless/fixed hops can be protected by different standards and protocols. There are current deployments of 802.11 WLAN for public residential service where the users connect to 802.11b Access Points and then the traffic is carried using 802.11a to an aggregation unit to be transported over fixed lines.

In such networks, the cost to perform encryption/decryption and then re-encryption at each base-station or access point proves to be very high. All uplink traffic at the BS/access point needs to be decrypted and then re-encrypted to the next wireless hop; the process is repeated for the downlink traffic. These operations are extremely costly even for large base stations, particularly when the core part of such a mesh network has to perform them for a large number of mobiles.

Figure 8:
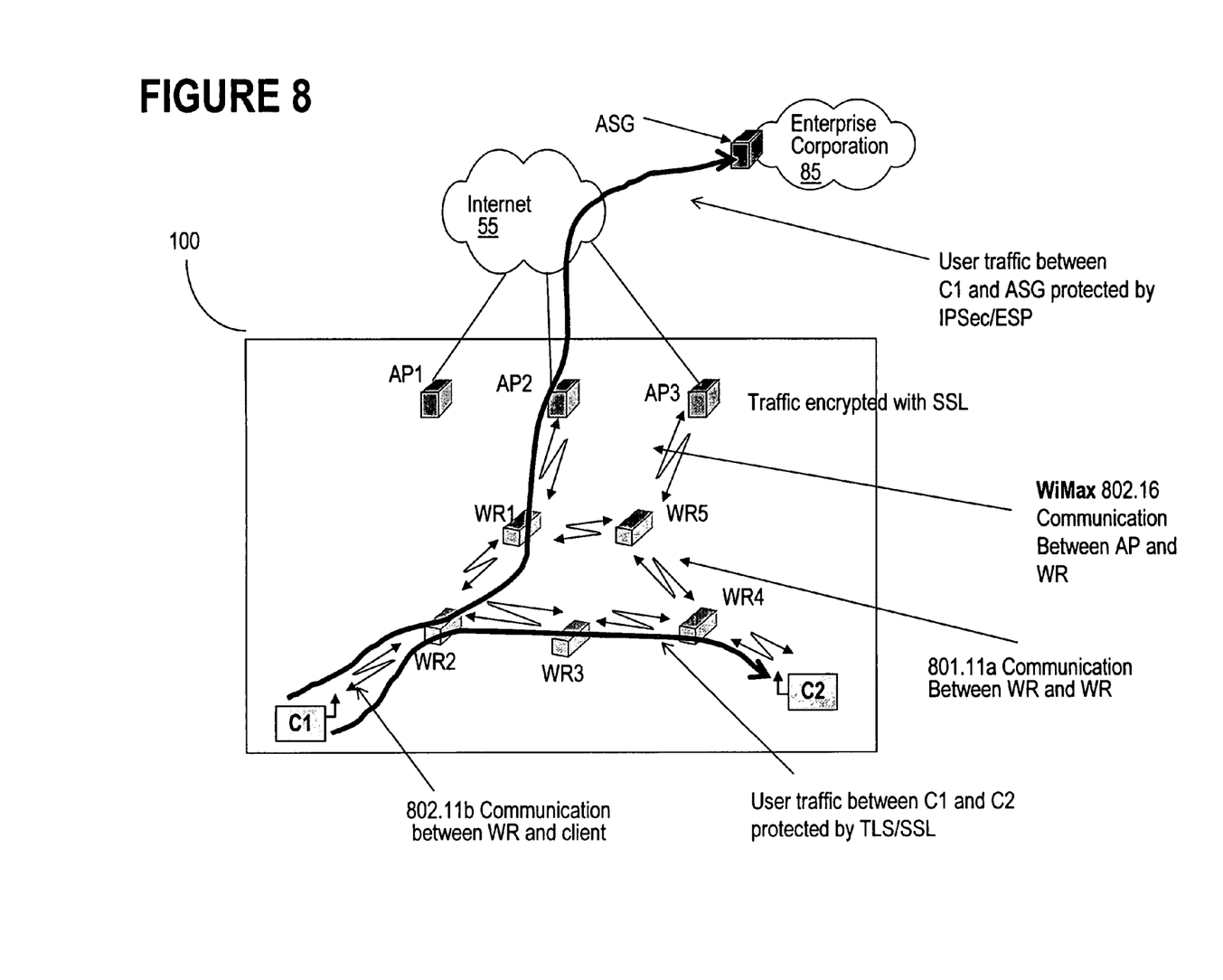
FIG. 8 is an example of a mesh network with single encryption according to the invention.

As seen in FIG. 8, the communication between a client C1 and a client C2 traverses over the Internet and through a mesh network 100. The mesh network includes fixed links (cable) between the Internet and the access points AP, such as AP1, AP2, AP3 and wireless links between wireless routers WR1-WR5. In principle, the access points communicate with wireless routers using WiMax (Wireless Protocols like 802.16 or 802.20), and the wireless routers communicate with one another using 802.11a. The client C1 and wireless router WR2 communicate using 802.11b. Each standard has its own encryption and decryption mechanisms and the traffic must therefore be encrypted and decrypted at each wireless hop. At the higher layers, communication between C1 and C2 is protected using SSL/TLS or other higher layer security protocols.

Using the invention, one can opt not to encrypt communication between the access point AP2 and wireless router WR1, between the wireless router WR1 and the wireless router WR2, and between the wireless router WR2 and the client C1. The invention may also be used to avoid double encryption on the datapath carrying traffic between C1 and the security gateway (ASG) to a corporate network 85. Once the datapath is protected using IPSec/ESP (HL encryption), and no encryption has to be performed at the L2 (Radio-level) at any of the devices (C1, WR2, WR1, AP2 and ASG) along the path.

It is to be noted that if the communications between access points and WRs and clients are all using the same Radio Standards one may use Layer 2 encryption from C1 to access point AP1 end-to-end without each of the intermediate hops opting not to encrypt/decrypt the traffic. The traffic from access point to C2 is then encrypted using higher layers.

We claim:

1. A method of avoiding double encryption at a mobile node (MN) that requests a connection with a remote terminal on an untrusted network, comprising the steps of:

a) establishing a datapath over a first link between said MN and a base station (BS) and a second link between said BS and said remote terminal, said datapath for serving said connection;

b) marking, at said MN, datagrams which must be encrypted during transmission over said second link with a first identifier, the first identifier identifying a first encryption standard;

c) marking, at said MN, datagrams which need not be encrypted during transmission over said second link with a second identifier, the second identifier identifying a second encryption standard;

d) encrypting, at said MN, datagrams marked with said first identifier according to said first encryption standard;

e) encrypting, at said MN, datagrams marked with said second identifier according to said second encryption standard; and f) decrypting, at said BS, only datagrams marked with said second identifier, according to said second encryption standard.

2. The method of claim 1, wherein step a) comprises:
authenticating said MN at said BS; and
notifying said MN of a pool of first identifiers and a pool of second identifiers.

3. The method of claim 1, wherein:
step b) comprises appending said first identifier to said datagram; and
step c) comprises appending said second identifier to said datagram.

4. The method of claim 3, wherein said first and second identifiers are appended to address information of said datagram.

5. The method of claim 2, wherein
step d) comprises Higher Level (HL) encrypting datagrams marked with said first identifier using an application-specific security mechanism and transmitting the HL encrypted traffic to said remote terminal, whereby the traffic is HL encrypted along said entire datapath; and
step e) comprises L2 encrypting datagrams marked with said second identifier using a L2 encryption mechanism and transmitting the data grams to said BS along said wireless link for L2 decryption.

6. The method of claim 5, wherein step f) comprises, for datagrams marked with said first identifier:
recording a source address and a destination address of said datagram in a secure link table (SLT), said source address and said destination address together indicating that said remote terminal is an application specific security gateway (ASG); and
identity checking said datagrams before retransmission to said ASG.

7. The method of claim 5, wherein step e) further comprises, for datagrams marked with said second identifier, L2 decrypting the datagrams and transmitting said datagrams to said remote terminal.

8. The method of claim 7, further comprising, for a datagram being sent from said remote terminal to said MN, at said base station:
determining if a source address and a destination address of said datagram are in said SLT;
appending a second identifier to said datagram when said source address and said destination address of said datagram are not in said SLT; and
L2 encrypting datagrams marked with said second identifier.

9. The method of claim 5, wherein said an application-specific security mechanism is one of Internet Protocol Security (IPSec), Secure Sockets Layer (SSL) and Transport Layer Security (TLS) mechanisms.

10. The method of claim 5, wherein said L2 encryption mechanism is one of Advanced Encryption Standard (AES), WEP, TKIP.

11. A base station (BS) for enabling a mobile node to access a remote terminal over a datapath having a first link between the MN and said BS and a second link between said BS and said remote terminal, comprising:
means for allocating to said MN a first plurality of identifiers for marking datagrams which must be HL encrypted during transmission over said second link;
means for allocating to said MN a second plurality of identifiers for marking datagrams which must be L2 encrypted during transmission over said first link and need not be HL encrypted during transmission over said second link;
means for determining whether an identifier carried by a datagram received from the MN belongs to said first plurality of identifiers or to said second plurality of identifiers; and
an L2 decryption mechanism for L2 decrypting only datagrams determined to carry an identifier belonging to said second plurality of identifiers.

12. The BS of claim 11, further comprising, means for transmitting said L2 decrypted datagrams to said remote terminal over said second link.

13. The BS of claim 11, further comprising means for transmitting said datagrams to said MN over said first link.

14. A mobile node (MN) for communicating with a remote terminal over a datapath with a first link between the MN and a base station (BS) and a second link between said BS and said remote terminal, comprising:
means for requesting from said BS a first plurality of identifiers and a second plurality of identifiers, wherein each identifier of said first plurality of identifiers corresponds to a HL encryption standard and each identifier of said second plurality of identifiers corresponds to an L2 encryption standard;
marking datagrams which must be encrypted during transmission over said second link with an identifier belonging to said first plurality of identifiers;
marking datagrams which need not be encrypted during transmission over said second link with an identifier belonging to said second plurality of identifiers;
an application specific mechanism for HL encrypting datagrams marked with an identifier belonging to said first plurality of identifiers; and
an L2 encryption mechanism for L2 encrypting datagrams marked with an identifier belonging to said second plurality of identifier.

15. A method of avoiding double encryption of packets sent by a mobile node over an untrusted network to a remote terminal, comprising the steps of:
a) establishing a datapath over a first link between the MN and an intelligent base station (iBS) and a second link between said iBS and said remote terminal, wherein said iBS is trusted by said MN;
b) Layer 2 (L2) encrypting datagrams at said MN using an L2 encryption mechanism;
c) transmitting said L2 encrypted datagrams from said MN to said iBS, along said first link;
d) L2 decrypting said L2 encrypted datagrams at said iBS;
e) Higher Level (HL) encrypting said L2 decrypted datagrams, at said iBS on behalf of said MN, using an application-specific security mechanism, wherein said HL encrypting occurs at a layer higher then L2; and f) transmitting the HL encrypted traffic from said iBS to said remote terminal, along said second link.

16. The method of claim 15, wherein said remote terminal is an application specific security gateway.

17. The method of claim 15, wherein step a) comprises, at said iBS:

verifying authenticity of said MN;

negotiating establishment of said second link in response to an "open session" request from said MN; and closing said second link in response to a "close session request".

18. The method of claim 15, wherein step e) comprises maintaining at said iBS a L2-HL mapping table, providing the correspondence between a L2 decryption application used for L2 decrypting the datagrams received over said first link and said application-specific security mechanism used for HL encrypting the datagrams transmitted over said second link.

19. The method of claim 18, wherein said first link is identified by an address of said mobile node, and said second link is identified by an address of said remote terminal.

20. The method of claim 18, wherein said L2-HL mapping table further comprises a security key used by said application-specific security mechanism.

21. The method of claim 15, further comprising for downlink communication over said datapath:

f) at said remote terminal, transmitting to said iBS HL encrypted datagrams addressed to said MN over said second link;

g) at said iBS, decrypting said HL encrypted datagrams, L2 encrypting said datagrams and transmitting said L2 encrypted datagrams to said MN over said first link.

22. The method of claim 21, wherein step g) comprises maintaining at said iBS a L2-HL mapping table, providing the correspondence between said application-specific security mechanism used for HL encrypting datagrams transmitted over said second link and a L2 decryption application used for L2 decrypting datagrams received over said first link.

23. An intelligent base station (iBS) for enabling a mobile node (MN) to access a remote terminal over a datapath having a first link between said MN and said iBS and a second link between said iBS and said remote terminal, comprising means for creating and managing secure channels on behalf of said MN;

means for Layer 2 (L2) decrypting datagrams arriving from said MN;

means for Higher Level (HL) encrypting said L2 decrypted datagrams on behalf of said MN, wherein said HL encrypting occurs at a layer higher than L2;

means for HL decrypting, for said MN, datagrams arriving from said remote terminal; and means for L2 encrypting said HL decrypted datagrams.

24. The BS of claim 11, further comprising:

a secure link table (SLT) for recording a source address and a destination address of datagrams determined to carry an identifier belonging to said first plurality of identifiers;

means for determining whether a source address and a destination address of a datagram received from said remote terminal appear together in said SLT; and an L2 encryption mechanism for L2 encrypting said datagram received from said remote terminal only when said datagram is determined to carry a source address and a destination address which do not appear together in said SLT.

25. The BS of claim 11, further comprising:

a secure link table (SLT) for recording a source address, a destination address, and an identifier of datagrams received from said MN;

means for determining an identifier associated, in said SLT, with a source address and a destination address of a datagram received from said remote terminal; and an L2 encryption mechanism for L2 encrypting said datagram received from said remote terminal only when said datagram is determined to be associated with an identifier belonging to said second plurality of identifiers.

* * * * *

UNITED STATES PATENT AND TRADEMARK OFFICE
CERTIFICATE OF CORRECTION

PATENT NO. : 7,613,920 B2
APPLICATION NO. : 11/207801
DATED : November 3, 2009
INVENTOR(S) : Gustave et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this

Nineteenth Day of October, 2010

David J. Kappos
*Director of the United States Patent and Trademark Office*